(12) United States Patent
Shimanouchi et al.

(10) Patent No.: US 9,312,071 B2
(45) Date of Patent: Apr. 12, 2016

(54) ELECTRONIC DEVICE HAVING VARIABLE CAPACITANCE ELEMENT AND MANUFACTURE METHOD THEREOF

(71) Applicant: FUJITSU LIMITED, Kawasaki-shi, Kanagawa (JP)

(72) Inventors: Takeaki Shimanouchi, Akashi (JP); Norinao Kouma, Atsugi (JP); Takashi Katsuki, Isehara (JP); Osamu Toyoda, Akashi (JP); Satoshi Ueda, Kakogawa (JP)

(73) Assignee: FUJITSU LIMITED, Kawasaki (JP)

( * ) Notice: Subject to any disclaimer, the term of this patent is extended or adjusted under 35 U.S.C. 154(b) by 303 days.

(21) Appl. No.: 13/973,165

(22) Filed: Aug. 22, 2013

(65) Prior Publication Data

US 2013/0342954 A1 Dec. 26, 2013

Related U.S. Application Data

(63) Continuation of application No. PCT/JP2011/001542, filed on Mar. 16, 2011.

(51) Int. Cl.
*H01G 5/16* (2006.01)
*H01G 5/18* (2006.01)

(52) U.S. Cl.
CPC ... *H01G 5/16* (2013.01); *H01G 5/18* (2013.01)

(58) Field of Classification Search
CPC .................................. H01G 5/16; H01G 5/18
See application file for complete search history.

(56) References Cited

U.S. PATENT DOCUMENTS

| 5,901,031 A * | 5/1999 | Ishige | H01G 5/16 361/277 |
| 6,065,341 A * | 5/2000 | Ishio | B81B 3/0051 361/283.3 |
| 7,405,635 B2 | 7/2008 | Hashimura | |

(Continued)

FOREIGN PATENT DOCUMENTS

| CN | 101231910 A | 7/2008 |
| JP | 2001-304868 A1 | 10/2001 |

(Continued)

OTHER PUBLICATIONS

Notice of Reasons of Rejection mailed Jan. 28, 2014 from the Japanese Patent Office for counterpart application No. 2013-504402 with English translation.

(Continued)

*Primary Examiner* — David M Sinclair
(74) *Attorney, Agent, or Firm* — Kratz, Quintos & Hanson, LLP

(57) ABSTRACT

An electronic device having a variable capacitance element, includes a support substrate providing physical support, a pair of anchors formed on the support substrate, and having support portions in a direction perpendicular to a surface of the substrate, a movable electrode supported by the support portions of the pair of anchors, having opposing first and second side surfaces constituting electrode surfaces, and at least partially capable of elastic deformation, a first fixed electrode supported above the support substrate, and having a first electrode surface opposing to the first side surface of the movable electrode, and a second fixed electrode supported above the support substrate, and having a second electrode surface opposing to the second side surface of the movable electrode.

9 Claims, 10 Drawing Sheets

(56) References Cited

U.S. PATENT DOCUMENTS

| | | | |
|---|---|---|---|
| 2002/0131230 A1* | 9/2002 | Potter | H01G 5/16 361/277 |
| 2003/0223176 A1* | 12/2003 | Fujii | H01H 59/0009 361/277 |
| 2004/0075967 A1 | 4/2004 | Lynch | |
| 2005/0155851 A1 | 7/2005 | Lynch | |
| 2007/0008674 A1* | 1/2007 | Mochizuki | G02B 6/3556 361/233 |
| 2007/0070576 A1 | 3/2007 | Lynch | |
| 2007/0092180 A1 | 4/2007 | Hashimura | |
| 2008/0180876 A1 | 7/2008 | Shimanouchi | |
| 2011/0063773 A1* | 3/2011 | Ikehashi | H01G 5/16 361/277 |

FOREIGN PATENT DOCUMENTS

| | | |
|---|---|---|
| JP | 2004-74341 | 3/2004 |
| JP | 2004-074341 A | 3/2004 |
| JP | 2004-74341 A1 | 3/2004 |
| JP | 2005-209625 A1 | 8/2005 |
| JP | 2006-147995 A1 | 6/2006 |
| JP | 2008-182134 A1 | 8/2008 |
| JP | 2009-59866 A1 | 3/2009 |
| JP | 2009-233836 | 10/2009 |
| JP | 2009-233836 A1 | 10/2009 |
| JP | 2009-252672 | 10/2009 |
| JP | 2009-252672 A1 | 10/2009 |
| JP | 2010-199214 A | 9/2010 |
| JP | 2010-199214 A1 | 9/2010 |
| JP | 2010-199241 | 9/2010 |
| WO | WO 2004/038848 | 5/2004 |

OTHER PUBLICATIONS

International Search Report for International Application No. PCT/JP2011/001542 dated Jun. 14, 2011.

Office Action of counterpart Chinese Application No. 201180069245.4 dated Sep. 6, 2015; translation of the Office Action.

* cited by examiner

ELECTRONIC DEVICE HAVING VARIABLE CAPACITANCE ELEMENT AND MANUFACTURE METHOD THEREOF

CROSS REFERENCE TO RELATED APPLICATION

This application is a continuation application of International Patent Application PCT/JP2011/001542, filed on Mar. 16, 2011.

FIELD

Embodiments of this invention relate to electronic devices having variable capacitance element and manufacture methods thereof.

BACKGROUND

A variable capacitance element generally has such a structure in which a stationary or fixed electrode and a movable electrode are disposed facing each other, and the capacitance is varied by displacing the movable electrode. The movable electrode can be displaced by piezoelectric drive, electrostatic drive, etc. In mobile electronic devices, miniaturization and reduction of weight are required, and variable capacitance elements using MEMS (micro electro-mechanical system) are being developed.

Such a structure is known wherein a stationary or fixed electrode is formed on a support substrate, a movable electrode is supported by a flexible beam, etc. above the stationary electrode, and the capacitance is varied by controlling the distance between the electrodes (for example, see JP-A 2006-147995).

FIG. 7A illustrates a structural example of such variable capacitance element. A variable capacitance element is formed by a variable capacitor with parallel plate structure one electrode of which is made movable, and a container structure sealing this variable capacitor.

A stationary electrode 103 and anchors 106 are formed on a semiconductor substrate 101 of such as silicon, via an insulating layer 102. The anchors 106 support a plate-shaped movable electrode 104 above the stationary electrode 103 via U-shaped flexible beams 105. The container including sidewall 110 and ceiling 111 is formed to surround outer periphery of the variable capacitor. By the existence of this container, it becomes possible to seal the variable capacitor in an inert gas atmosphere such as rare gas, or in a reduced pressure atmosphere. When the container is made of metal material, electric shield also becomes possible.

When voltage V is applied between the stationary electrode 103 and the movable electrode 104, the movable electrode 104 is attracted toward the statinary electrode 103 by the electrostatic force. When the movable electrode 104 is displaced toward the stationary electrode 103, the flexible beams 105 are bent. Restoring force proportional to the amount of displacement works to return the movable electrode 104 back to the original position. The movable electrode 104 is displaced up to the balanced position where the electrostatic force and the restoring force balance each other, and is held at the balanced position as long as the voltage V is applied.

When the voltage V is reduced to zero, the movable electrode 104 returns to the original position. Therefore, the capacitance element constituted of the stationary electrode 103 and the movable electrode 104, works as a variable capacitance element the static capacitance of which can be controlled by the applied voltage V.

FIG. 7B is a cross-section of another structural example of variable capacitance element. On a semiconductor substrate 101 of such as silicon, a stationary or fixed electrode 103 is formed through an insulating layer 102, and another insulating layer 112 is formed on the insulating layer 102 to cover the stationary electrode 103. Anchors 106 are formed on the insulating layer 112. The anchors 106 support a plate shaped movable electrode 104 via flexible beams 105 above the stationary electrode 103 via the insulating layer 112. A container including sidewall 110 and ceiling 111 is formed to surround the outer periphery of the variable capacitor. Since the surface of the stationary electrode 103 is covered with the insulating layer 112, short-circuit and sticking between the electrodes can be suppressed.

In a digital type variable capacitor element, capacitance formed in a state where the movable electrode is separated from the fixed electrode, is the minimum value (off state), and capacitance formed in a state where the movable electrode touches the fixed electrode through a dielectric film, is the maximum value (on state). These two states are used as a variable capacitance.

The electrode of a capacitor can be formed not only parallel to the substrate surface, but also be formed perpendicular or vertical to the substrate surface (for example, see JP-A 2001-304868)). For example, a variable capacitor having electrodes perpendicular to the substrate surface can be formed using an SOI (silicon-on-insulator) substrate in which a single crystal silicon layer is provided above upper surface of a single crystal silicon substrate via a silicon oxide film serving as a binding layer.

Impurity atoms such as phosphor and boron are doped in the single crystal silicon layer to reduce the resistance of the single crystal silicon layer. A resist mask is formed on the single crystal silicon layer, and the single crystal silicon layer is etched by reactive ion etching, etc. leaving anchors, various comb shaped electrodes, and various pad portions on the silicon oxide film. The comb shaped electrodes are coupled in inter digital shape to form a capacitor. The respective electrodes are shaped perpendicular to the silicon substrate surface.

The silicon oxide film can be removed by selective etching by frolic acid aqueous solution, etc. to separate the active silicon layer from the support Si substrate, to give freedom of displacement. Such structures as vibrators, beams, and comb shaped electrodes can be formed. Conductor such as aluminum is vapor deposited on various pad portions to form electrode pads. Such a structure is obtained in which respective portions formed above the substrate are constituted of low resistivity layers insulated from the substrate, and vibrators, beams, comb shaped electrodes etc. are positioned floating above the substrate by a predetermined distance, and are supported by the substrate to be capable of vibration via the anchors.

Patent document 1: JP-A 2006-147995,
Patent document 2: LP-A 2001-304868

SUMMARY

According to one aspect of this invention, there is provided an electronic device having a variable capacitance element, including:

a support substrate providing physical support, a pair of anchors formed on the support substrate, and having support portions in a direction perpendicular to a surface of the substrate, a movable electrode supported by the support portions of the pair of anchors, having opposing first and second side surfaces constituting electrode surfaces, and at least partially capable of elastic deformation, a first fixed electrode supported above the support substrate, and having a first electrode surface opposing to the first side surface of the movable electrode, and a second fixed electrode supported above the support substrate, and having a second electrode surface opposing to the second side surface of the movable electrode.

According to another aspect of this invention, there is provided a method for manufacturing an electronic device having a variable capacitance, including:

preparing a substrate including a sacrificial layer on a support substrate, forming a first mask having apertures of shapes of opposing fixed electrodes on a surface of the substrate, etching the sacrificial layer exposed in the apertures of the first mask, to form trenches for accommodating fixed electrodes, forming a second mask having a slit shaped aperture of shape of a movable electrode disposed between the fixed electrodes, on the surface of the substrate, etching the sacrificial layer exposed in the slit shaped aperture, to form a slit for accommodating a movable electrode, and forming conductive members in the trenches and in the slit.

The object and advantages of the invention will be realized and attained by means of the elements and combinations particularly pointed out in the claims.

It is to be understood that both the foregoing general description and the following detailed description are exemplary and are not restrictive of the invention, as claimed.

DESCRIPTION OF EMBODIMENTS

Figure 1A:
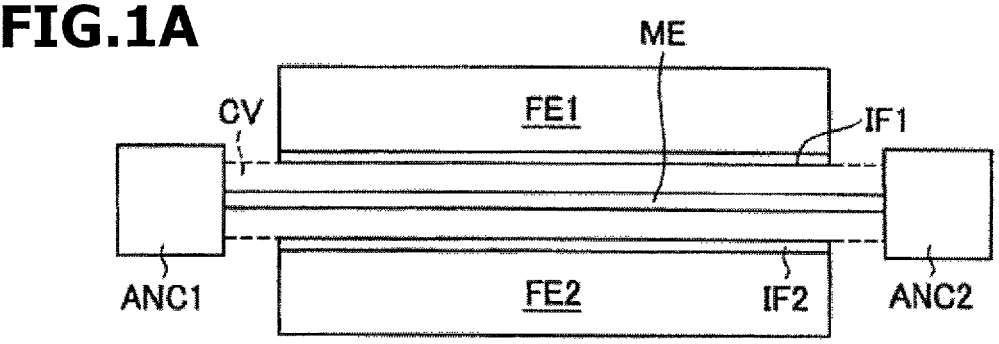
FIGS. 1A and 1B are a plan view and a cross section schematically illustrating structure of a variable capacitance element according to a first embodiment.

Even in the case wherein a fixed or stationary electrode is covered with a dielectric film, the dielectric film may be charged up along with repeated on/off operations, and sticking phenomenon may occur in which the movable electrode cannot be separated from the dielectric film even when the external power source is turned off. Countermeasure by the drive waveform is being discussed, but does not reach a solution.

In the case wherein the envelope of high frequency signal is modulated by a signal waveform, and is applied to a movable electrode, there is a phenomenon called self actuation in which the movable electrode moves by the voltage difference based on the signal waveform. There is a method of increasing the drive voltage in response to electric power of the thrown signal, for preventing self actuation. When the drive voltage is increased, sticking can more easily occur. Also, a booster circuit may become necessary for securing a higher voltage.

The present inventors thought of a structure wherein first and second fixed or stationary electrodes are located on both sides of a movable electrode, the movable electrode is attracted to the first fixed electrode through an insulating film in "on" state, and the movable electrode is attracted to the second fixed electrode through an insulating film in "off" state. In either of "on" and "off" states, the movable electrode is attracted to one of the two fixed electrodes, and the capacitance will not change.

Both the transition from "off" state to "on" state and the transition from "on" state to "off" state, can be positively performed by electrostatic attractive force by the voltage applied between the movable electrode and the first or the second fixed electrode. Even in the case wherein sticking phenomenon occurs in which the movable electrode is attracted to one fixed electrode, and cannot be separated therefrom, it becomes easier to separate the movable electrode by utilizing electrostatic attractive force by applying a voltage between the other fixed electrode and the movable electrode. Sticking can be suppressed. Since the movable electrode does not displace except the transient state, basically self actuation can also be suppressed. improvement in drive reliability and reduction in drive voltage can be expected.

One of the first and the second fixed electrodes may be a dummy electrode which does not function as electric circuit. Of course, the first and the second fixed electrodes may be positively utilized as two variable capacitors which have symmetric "on"/"off" states.

When the first and the second fixed electrodes are disposed in parallel, and the movable electrode is disposed near the first fixed electrode at one end and near the second fixed electrode at the other end, further effect will be obtained. In case the movable electrode is attracted to the first fixed electrode, when a voltage is applied between the second fixed electrode and the movable electrode, this voltage generates a strong electrostatic attraction force, reversely proportional to the distance, in a region where the movable electrode and the second fixed electrode are near (at the other end of the movable electrode). Therefore, it becomes easier to separate the movable electrode from the other end. When the movable electrode is attracted to the second fixed electrode, it becomes easy to separate the movable electrode from one end by applying a voltage between the first fixed electrode and the movable electrode, by similar reason.

In case of forming a plate shaped electrode on a surface of a semiconductor substrate, it would be not easy to form a movable electrode in oblique relationship to a surface of a fixed electrode. In case of using an SOI substrate and forming electrodes in substantially vertical or perpendicular direction relative to a surface of a semiconductor substrate, an oblique electrode between parallel electrodes would also be realized only by changing the pattern configuration.

Variable capacitance elements according to the embodiments will be described hereinafter referring to the drawings.

Figure 1B:
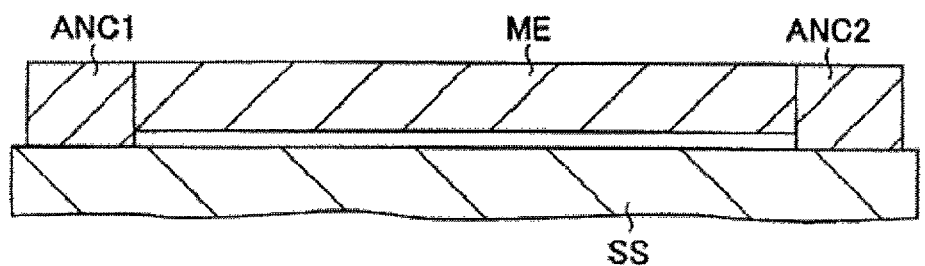

FIGS. 1A and 1B are a schematic plan view and a schematic cross section illustrating basic structure of a variable capacitance element according to an embodiment. Between anchors ANC1 and ANC2, a movable electrode ME having at least partially flexible portion is supported. As illustrated in FIG. 1B, the anchors ANC1 and ANC2 are supported on a support substrate SS, and are formed of conducting material. The movable electrode ME is formed of, for example, a metal sheet capable of elastic deformation and oriented perpendicular to the surface of the support substrate SS, and is supported by the anchors ANC1 and ANC2. Gap is formed between the lower edge of the movable electrode ME and the support substrate SS, allowing the movable electrode to be displaceable. As illustrated in FIG. 1A, on both sides of the movable electrode ME, fixed electrodes FE1 and FE2 having side surfaces facing to the two electrode surfaces of the movable electrode, and having insulating films IF1 and IF2 on the opposing side surfaces, are disposed, and supported on the support substrate SS. Between the movable electrode ME and the fixed electrodes FE1 and FE2, cavity (free space) denoted by CV in FIG. 1A is formed to secure a space in which the movable electrode is capable of displacement.

Structure of this kind can be manufactured, for example, by forming fixed electrodes by performing plating in a space defined by a resist mask on a support substrate, forming an insulating film, and forming anchors and a movable electrode by performing plating in a space defined by a resist mask on a support substrate again. Here, the metal sheet may include laminated metal layers, and may include an alloy layer.

Figure 1C:
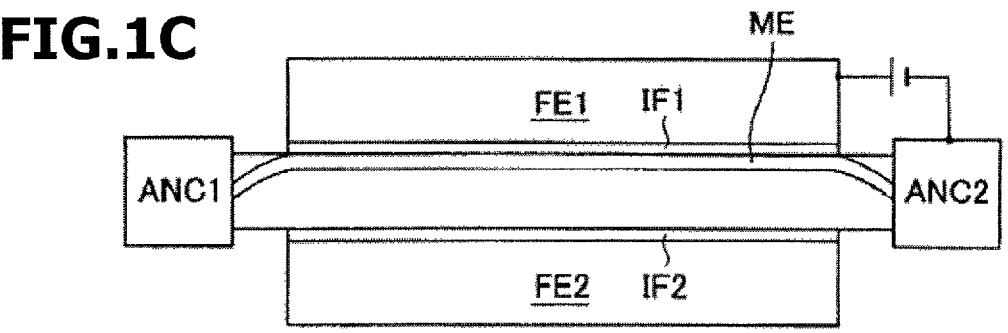
FIGS. 1C and 1D are plan views illustrating operations of actions.

As illustrated in FIG. 1C, when a dc voltage is applied between the fixed electrode FE1 and the movable electrode ME, electrostatic attraction is generated between the fixed electrode FE1 and the movable electrode ME to pull the movable electrode ME toward the fixed electrode FE1. By forming the movable electrode ME in sufficiently deformable configuration, most area of the movable electrode ME facing the fixed electrode FE1 adheres to the fixed electrode FE1 through the insulating film IF1.

Figure 1D:
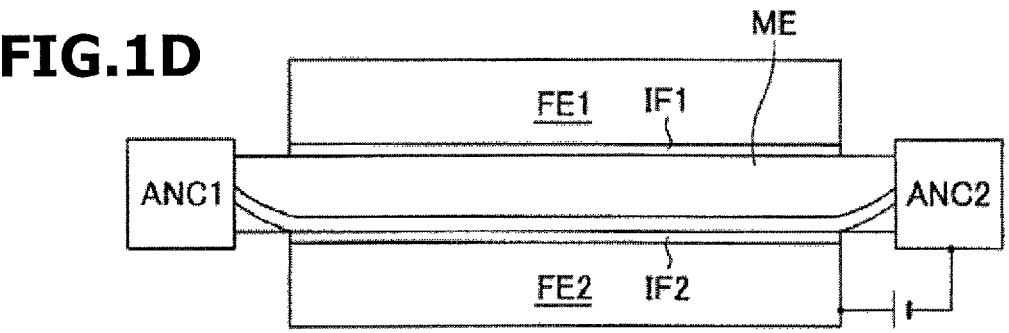

As illustrated in FIG. 1D, the bias power source between the fixed electrode FE1 and the movable electrode ME is turned off, and a dc voltage is applied between the fixed electrode FE2 and the movable electrode ME. Electrostatic attraction between the movable electrode ME and the fixed electrode FE1 disappears, and attraction between the movable electrode ME and the fixed electrode FE2 is newly generated. The movable electrode ME is separated from the fixed electrode FE1, and is attracted toward the fixed electrode FE2, and adheres thereto.

Compared with the conventional case of separating a movable electrode from a fixed electrode only by elastic restoring force of the movable electrode, reliability of operation will be improved since the movable electrode is enforcedly pulled away from the fixed electrode by elastic restoring force and electrostatic attraction.

In the state of FIG. 1C, the movable electrode ME is at a position separated from the second fixed electrode FE2, and in the state of FIG. 1D, the movable electrode ME is at a position separated from the first fixed electrode FE1. when the distance is increased, electrostatic attraction decreases. If a portion of the movable electrode is restricted to a position near the first fixed electrode, and another portion of the movable electrode is restricted to a position near the second fixed electrode, positions can be secured where static attraction surely works.

Figure 2A:
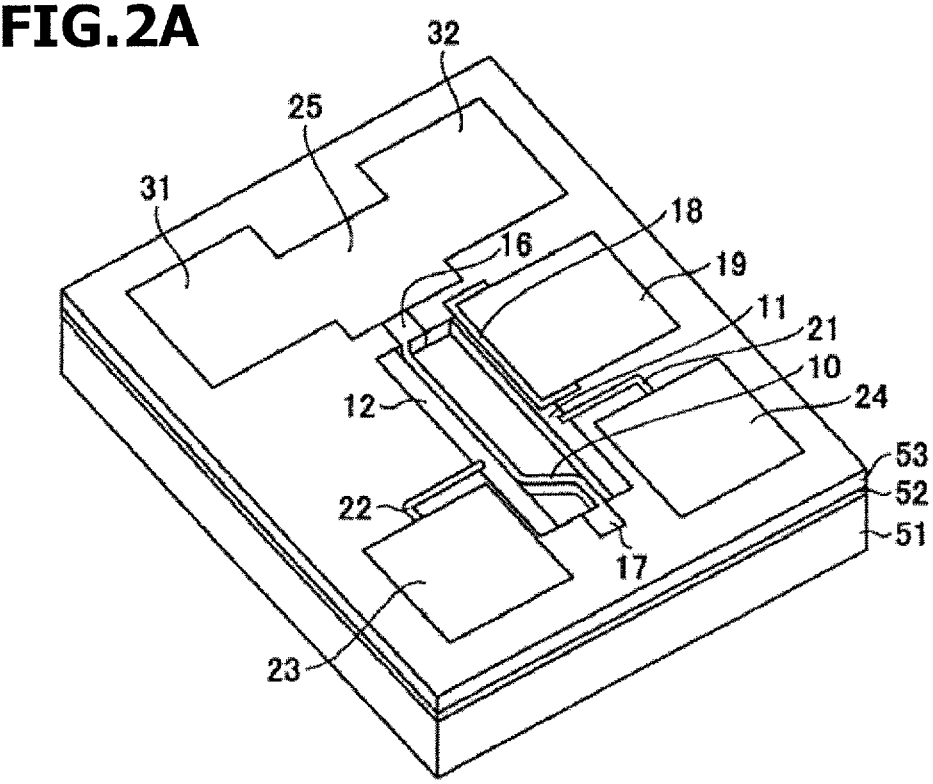
FIGS. 2A, 2B, and 2C are a perspective view schematically illustrating structure of an electronic device having a variable capacitance element according to a second embodiment, and plan views illustrating two states of the variable capacitance element.

FIG. 2A is a schematic perspective view of a variable capacitance element according to a second embodiment. An SOI (silicon on insulator) substrate wherein an active Si layer 53 is bonded to a support Si substrate 51 with a bonding silicon oxide film 52, is used. For example, the support Si substrate 51 has a thickness of 300 µm-500 µm, and the bonding silicon oxide film 52 has a thickness of 2 µm-7 µm. The active Si layer is a high resistivity single crystal Si layer of 500 Ωcm or higher, and has a thickness of 20 µm-30 µm.

Fixed electrodes 11 and 12 are formed, embedding trenches which penetrate the total thickness of the active Si layer 53, with opposing side surfaces in parallel, sandwiching a movable electrode 10. The heights of the opposing side surfaces of the movable electrode 10, and the fixed electrodes 11 and 12 are 20 µm-30 µm, which is the same as the thickness of the active Si layer 53. The fixed electrodes 11 and 12 have a length of, for example, 500 µm, and are opposedly disposed with a distance of 20 µm. The active Si layer 53 between the fixed electrodes 11 and 12 is removed, and the movable electrode 10 is disposed in the removed space. The bonding silicon oxide film 52 under the space for accommodating the movable electrode 10 is removed, to secure the freedom of the movable electrode 10. The movable electrode 10 has, for example, a thickness of 2 µm-5 µm, and has a length longer than those of the fixed electrodes 11 and 12.

The movable electrode 10 is supported by the anchors 16 and 17 at the two ends. The movable electrode 10, the fixed electrodes 11 and 12, and anchors 16 and 17, include, for example Au or Cu as the main composition, and are made in the same plating process. The variable capacitor is constituted of the fixed electrodes 11 and 12, the movable electrode 10, and the anchors 16 and 17 supporting the movable electrode. On the upper surface (side surface as a capacitor) of one fixed electrode 11, not facing the movable electrode, a dielectric film 18 of a thickness of 0.2 µm-0.5 µm, made for example of silicon oxide, silicon nitride, alumina, etc., is formed and an electrode 19 mainly composed of Au, Al, etc. is formed thereon, to constitute a fixed capacitor. Further, resistor elements 21 and 22 of Si—Cr alloy film extending from the upper surface of the fixed electrodes 11 and 12 to the exterior, are formed, and electrodes 23 and 24 are connected to the other ends of the resistor elements. The anchor 16 is connected to an electrode 25 between high frequency signal lines 31 and 32.

Figure 2B:
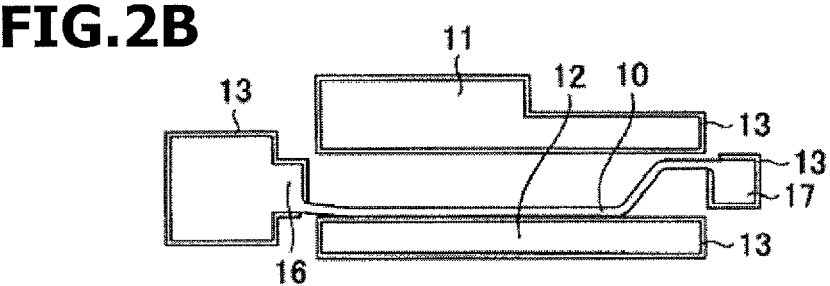

FIG. 2B will be referred to. An insulating film 13 is formed on the surface of the fixed electrodes for avoiding short-circuit between the electrodes. The surfaces of the fixed electrodes 11 and 12 are covered, for example, with an insulating film 13 of silicon nitride so that short-circuit between the movable electrode 10 and the fixed electrodes 11 and 12 is prevented. In this embodiment, the insulating film 13 is also formed on the surfaces of the anchors 16 and 17, to enhance insulation between the electrodes of the variable capacitor and the surrounding active Si layer 53. Any insulating film is formed on the surface of the movable electrode 10, to secure elasticity of the movable electrode, and avoid peel-off of the insulating film.

The movable electrode 10 is disposed asymmetrically between side surfaces of the fixed electrodes 11 and 12 disposed in parallel, lower on the left side and higher on the right side in the figure. The movable electrode is so formed that it extends from the lower end of the anchor 16 in the figure to the upper end of the anchor 17 in the figure. Namely, left part of the movable electrode 10 near the anchor 16 is disposed nearer to the fixed electrode 12 than to the fixed electrode 11, and right part of the movable electrode 10 near the anchor 17 is disposed nearer to the fixed electrode 11 than to the fixed electrode 12.

When a voltage is applied between the movable electrode 10 and the fixed electrode 12, the movable electrode 10 is attracted toward the fixed electrode 12 by the electrostatic attraction. At left part of the movable electrode 10 where the distance from the fixed electrode is short, the movable electrode 10 is attracted toward the fixed electrode 12, and gradually more right part of the movable electrode 10 is attracted to the fixed electrode 12. Since the right end of the movable electrode 10 is positioned near to the fixed electrode 11 than to the fixed electrode 12, it is separated from the fixed electrode 12.

Figure 2C:
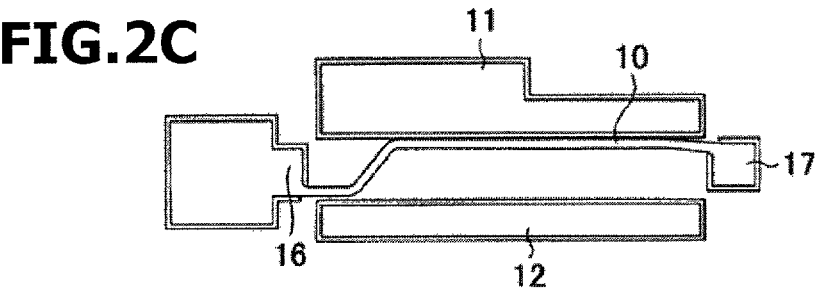

FIG. 2C will be referred to. When a voltage is applied between the movable electrode 10 and the fixed electrode 11, the movable electrode 10 is attracted toward the fixed electrode 11 by the electrostatic attraction. Since the right end of the movable electrode 10 is positioned nearer to the fixed electrode 11 than to the fixed electrode 12, it is swiftly attracted to the fixed electrode 11, and gradually more left part of the movable electrode 10 is attracted to the fixed electrode 11.

Thus, since the movable electrode is disposed obliquely between the directionally disposed fixed electrodes 11 and 12, near the fixed electrode 11 on one side and near the fixed electrode 12 on the other side, there is a portion where attractive force easily acts in either case of being attracted to either fixed electrode, and the changing action can be swiftly performed.

Hereinafter, major processes of a method for manufacturing a semiconductor device including a variable capacitance element illustrated in FIG. 52A will be described referring to FIGS. 3A-3L.

Figure 3A:
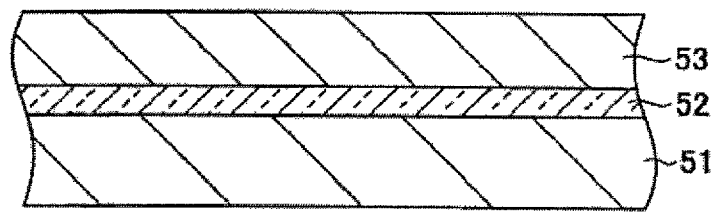
FIGS. 3A-3L are cross sections illustrating manufacturing processes of an electronic device having a variable capacitance element according to the second embodiment.

As illustrated in FIG. 3A, an SOI substrate in which an active Si layer 53 of a thickness 25 µm having a high resistivity of 500 Ωcm or more is coupled with an Si substrate 51 of, for example a thickness of 300 µm-500 µm, via for example, a bonding silicon oxide film 52 of a thickness of about 5 µm, is prepared.

Figure 3B:
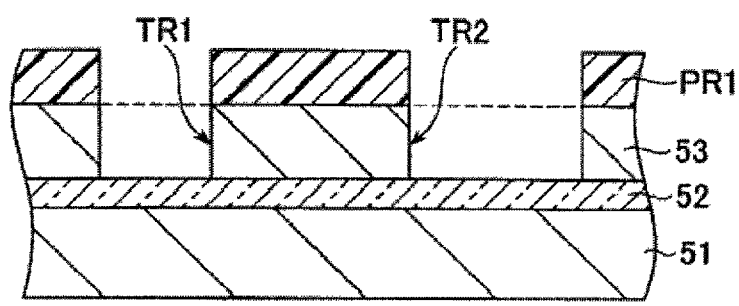

As illustrated in FIG. 3B, a resist pattern PR1 having apertures for defining trenches TR1 and TR2 for accommodating fixed electrodes is formed on the active Si layer 53. The resist pattern PR1 also has apertures for defining anchors. The active Si layer 53 is etched its full thickness using the resist pattern as a mask, for example by deep RIE. The deep RIE uses $CF_4$ ($+O_2$), $SF_6$ ($+O_2$, or $+H_2$) as Si etching gas. Thereafter, the resist pattern PR1 is removed.

Figure 4A:
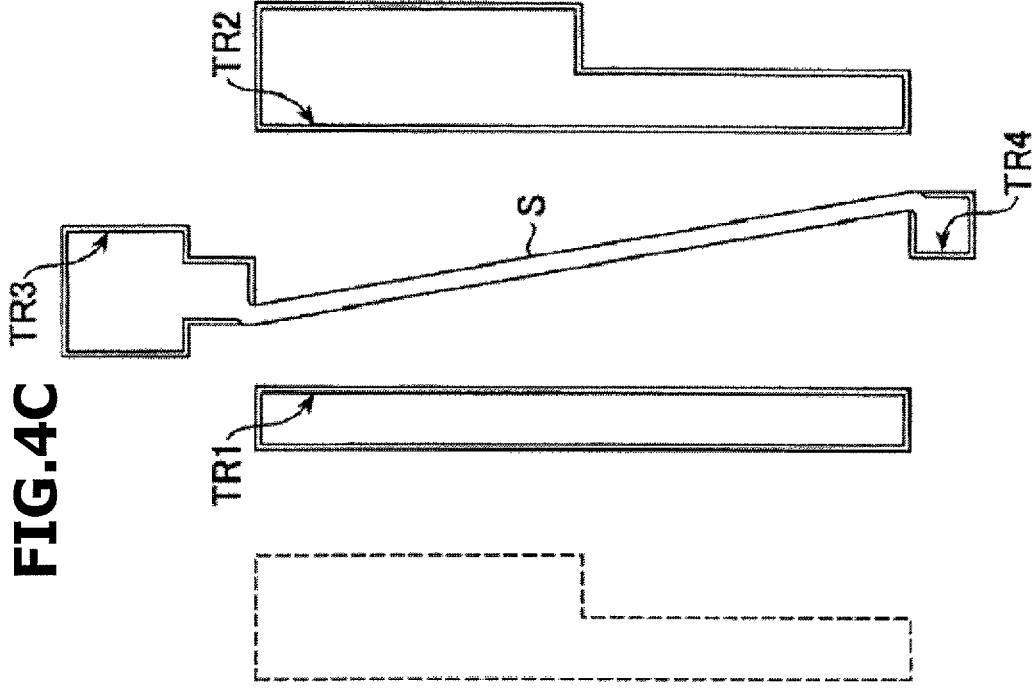
FIGS. 4A-4E are plan views of the states of FIGS. 3C, 3D, 3E, 3J, and 3K.

As illustrated in FIG. 4A, for example, the trenches TR1 and TR2 have parallel side surfaces of a length of 500 µm opposing each other at a distance of 20 µm. The reason of wider right trench TR2 is to form a fixed capacitor thereon. Trenches TR3 and TR4 for anchors have structure for supporting the movable electrode between the fixed electrode. An electrode is connected to the upper anchor.

Figure 3C:
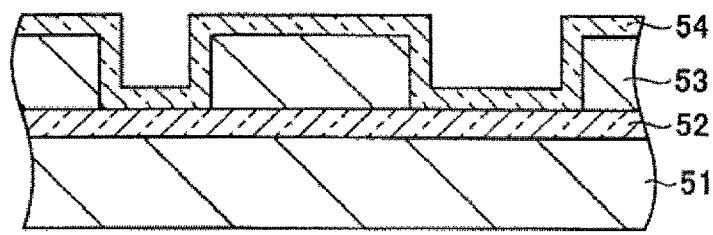

As illustrated in FIG. 3C, a silicon nitride film 54 having a thickness 0.1 µm-0.5 µm is deposited on the substrate surface by CVD or low pressure (LP) CVD using silane series gas such as monosilane, disilane, etc. and ammonia gas. Exposed surfaces of the active Si layer 53 and the bonding silicon oxide film 52 are covered with the silicon nitride film 54. This silicon nitride film 54 serves as an insulating film covering the surfaces of the fixed electrodes. FIG. 4A illustrates the silicon nitride film 54 deposited on the trench surfaces in penetrated viewing manner.

Figure 3D:
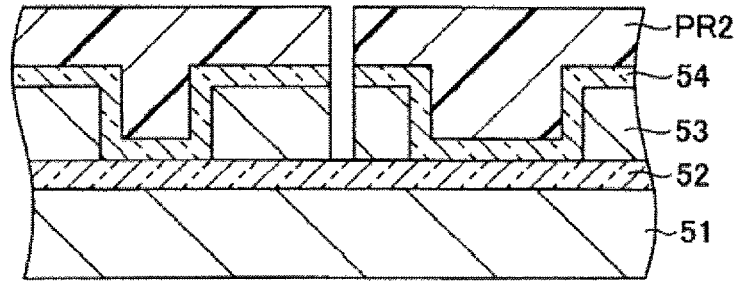
Figure 4B:
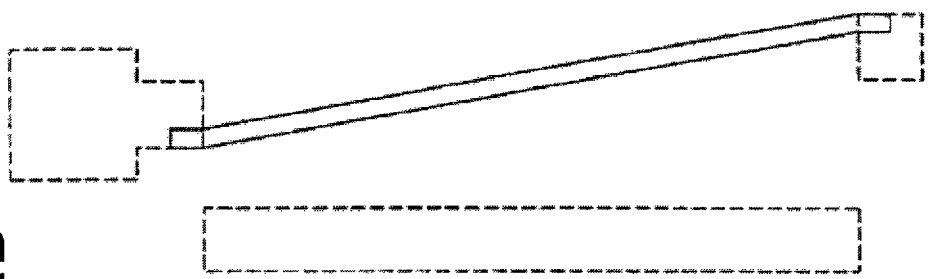

As illustrated in FIG. 3D, a resist pattern PR2 having an aperture defining a movable electrode is formed on the silicon nitride film 54, and the active Si layer 53 exposed in the aperture is etched by its full thickness by deep RIE. FIG. 4B illustrates plan shape of the aperture. The insulating film is not formed on the surface of the movable electrode, by forming the slit for the movable electrode after deposition of the silicon nitride film 54. Electric conduction between the movable electrode and the anchors is secured by overlapping the slit with part of the sidewall of the trenches for forming anchors.

Figure 3E:
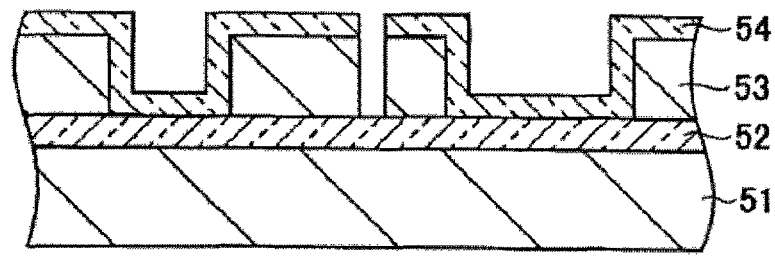
Figure 4C:
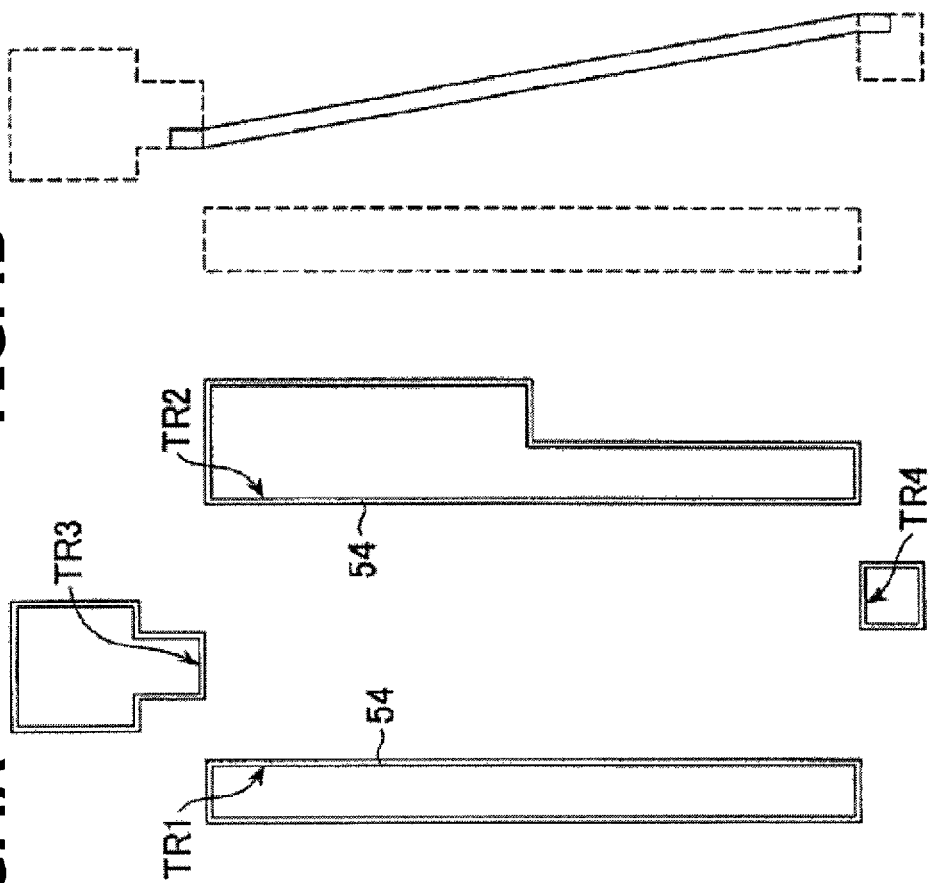

The resist pattern PR2 is removed to realize a state as illustrated in FIGS. 3E and 4C. The active Si layer 53 is removed by its full thickness in the trenches TR1-TR4, and the silicon nitride film 54 is deposited on the inner surfaces of the trenches. The slit S does not have the silicon nitride film 54, and penetrates the full thickness of the active Si layer 53 with a constant width, for example about 2 µm.

Figure 3F:
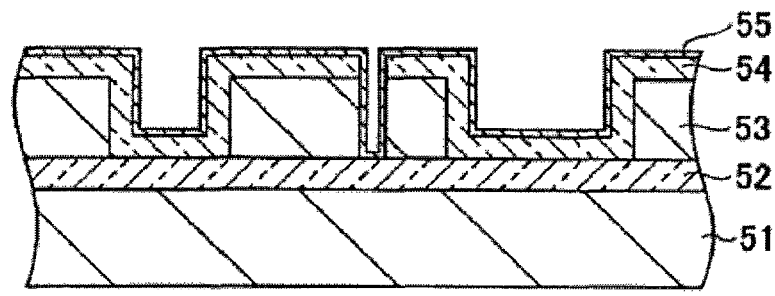

As illustrated in FIG. 3F, on the surface of the substrate, for example a Ti layer is deposited to a thickness of the order of 50 nm, and an Au layer is deposited thereon to a thickness of the order of 500 nm to form a seed layer. In place of the Ti layer, a Cr layer with a thickness of the order of 50 nm can be used. The seed layer 55 serves as a current supplying layer in electrolytic plating.

Figure 3G:
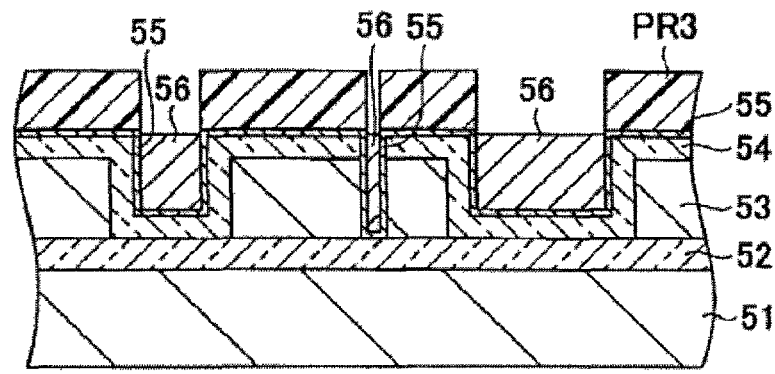

As illustrated in FIG. 3G, a resist pattern PR3 is formed in the regions where plating is not necessary covering the seed layer 55, an Au layer 56 is deposited by electrolytic plating, to embed the trenches TR, and the slit S. Here, in place of Au, Cu may be electrolytically plated. Thereafter, the resist pattern PR3 is removed, and exposed seed layer 55 is removed by etching or milling.

Figure 3H:
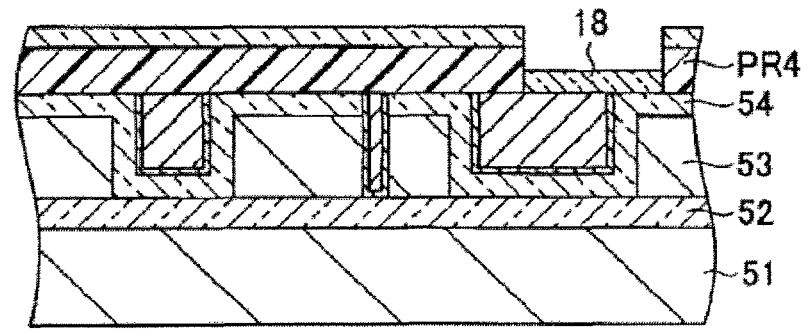

As illustrated in FIG. 3H, a resist pattern PR4 for patterning a dielectric film is formed on the substrate formed with electrodes, a dielectric film 18 of silicon oxide film, silicon nitride film, or aluminum oxide film etc. is deposited by sputtering to a thickness of 0.2 µm-0.5 µm, and the dielectric film deposited on the resist pattern PR4 is lifted off together with the resist pattern PR4.

Figure 3I:
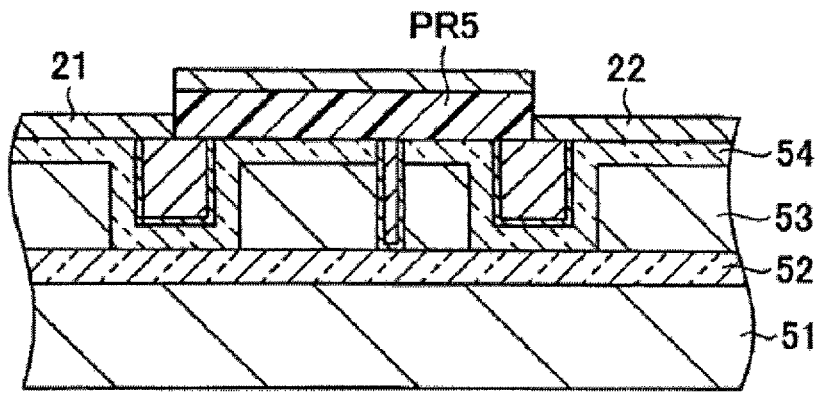

As illustrated in FIG. 3I, a resist pattern PR5 for patterning resistance elements is formed on the substrate from which the resist pattern PR4 has been removed, a Cr—Si alloy film is deposited by sputtering, and the Cr—Si alloy film on the resist pattern PR5 is removed by lift-off. For example, using a sputtering target of Si(70-90):Cr(30-10), a Si—Cr alloy film of a thickness of the order of 0.2 µm (sheet resistance 300-600Ω) is formed, and resistance elements 21 and 22 are formed. Here, the resistance film may be formed before the formation of the dielectric film.

Figure 3J:
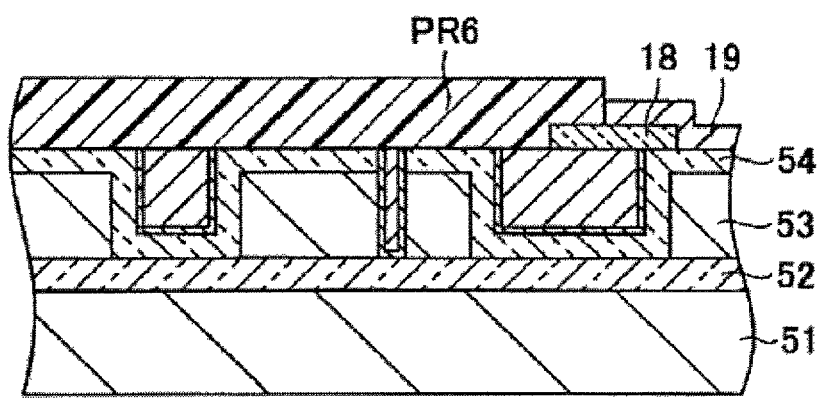
Figure 4E:
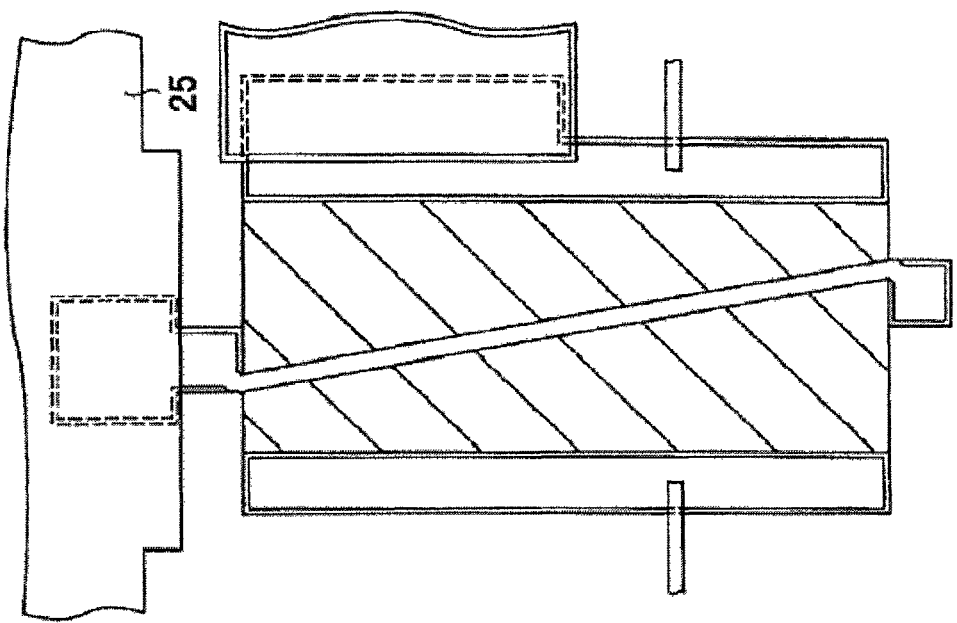
Figure 4D:
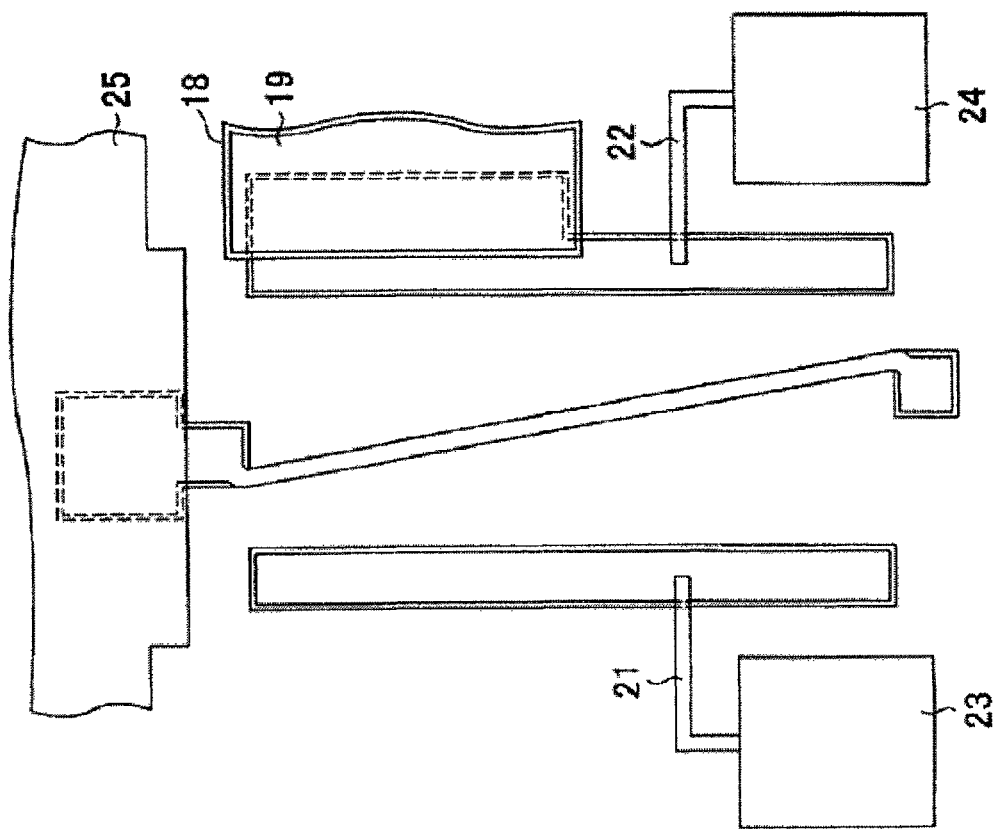

As illustrated in FIG. 3J, a resist pattern PR6 for patterning electrodes is formed on the substrate from which the resist pattern PR5 has been removed, electrode film of Ti/Au lamination or Ti/Al lamination is deposited by sputtering to a thickness of the order of 1 µm, and the electrode film on the resist pattern is removed by lift-off. Those electrodes 19, 23, 24, and 25 as illustrated in FIG. 4D are thus formed.

Figure 3K:
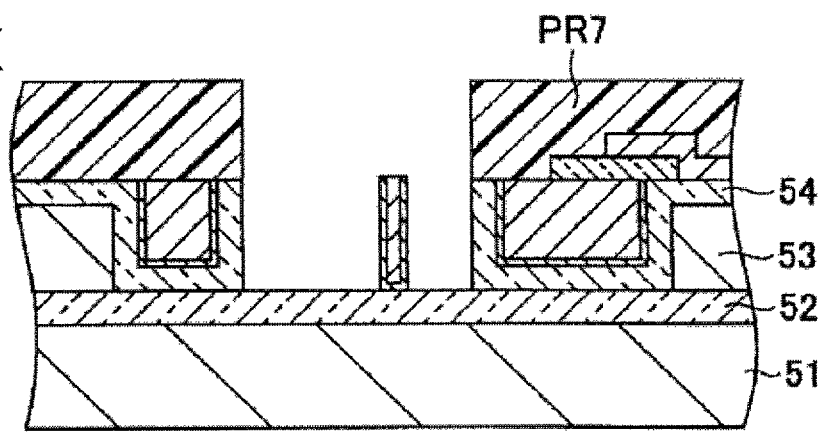

As illustrated in FIG. 3K, a resist pattern PR7 having an aperture in the region between the fixed electrodes is formed on the substrate, and the silicon nitride film 54 is etched by dry etching using $CHF_3$ gas, and the exposed silicon layer is removed by deep RIE using $SF_6$ gas and $CF_4$ gas. In FIG. 4E, the hatched area is the region to be etched.

Figure 3L:
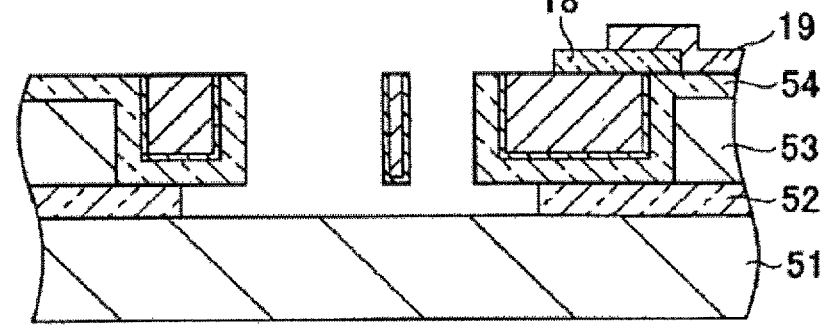

As illustrated in FIG. 3L, the exposed silicon oxide film 52 is removed by dry etching using $CF_4$ gas. Here, the silicon oxide film may also be etched by wet etching using buffered fluoric acid or vapor etching using vaporized fluoric acid. When the silicon oxide film is removed by etching having isotropic nature, the silicon oxide film is also etched in the region intruded from the exposed region into the surroundings by side etching. Thus, a semiconductor device having a variable capacitor as illustrated in FIG. 2A can be manufactured.

The variable capacitor exhibits capacitance change between "on" state and "off" state, for example of the order of 0.9 pF ("off" state)-5.6 pF ("on" state).

Figure 5A:
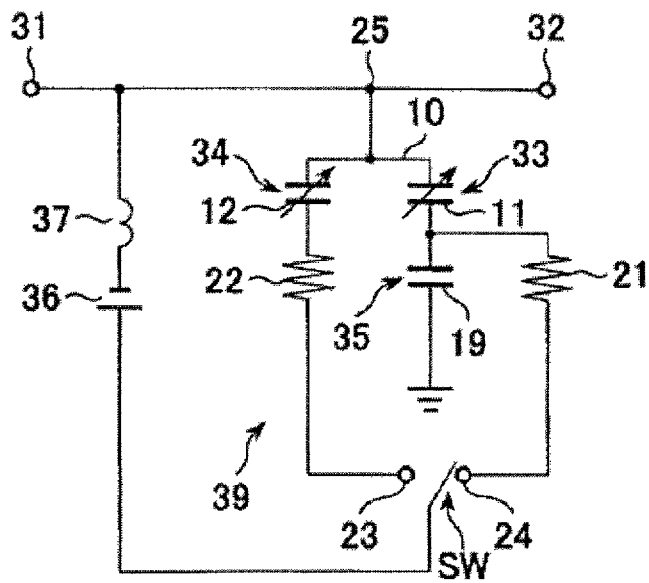
FIGS. 5A and 5B are equivalent circuit diagrams illustrating two examples of applied circuits of an electronic device having a variable capacitance element.

FIG. 5A is an equivalent circuit diagram illustrating one example of application circuit of variable capacitor thus formed. A movable electrode 10 is connected to a node in the electrode 25 of a high frequency line 31-25-32, and forms variable capacitors 33 and 34 with the fixed electrodes 11 and 12. The fixed electrode 11 is grounded via the fixed capacitor 35, and connected to a terminal 24 of a switch SW. The other fixed electrode 12 is connected to the other terminal 23 of the switch SW via the resistance element 22, to constitute a variable capacitance circuit 39. A series connection of a dc power source 36 and an inductor 37 is connected between the change-over terminal of the switch and the high frequency line. For substantially preventing leakage, the resistance elements 21 and 22 are 10 kΩ or more, and the inductor is about 100 nH or more.

Variable capacitors 33 and 34 are connected to the high frequency signal line 31-25-32, the fixed capacitor 35 is connected between the variable capacitor 33 and the ground, and the resistance elements 21 and 22 are connected between the variable capacitors 33 and 34 and the external power source 36. The inductor 37 is connected between the other pole of the external power source 36 and the high frequency signal line 31-25-32 to cut high frequencies. Leakage of signal flowing in the high frequency signal line 31-25-32 to the external power source 36 is prevented by the resistance elements 21 and 22. Short circuit between the external power source and the ground is prevented by the fixed capacitor 35. One of the two digital states is selected whether the movable electrode 10 is attracted to the fixed electrode 11, or to the fixed electrode 12.

Figure 5B:
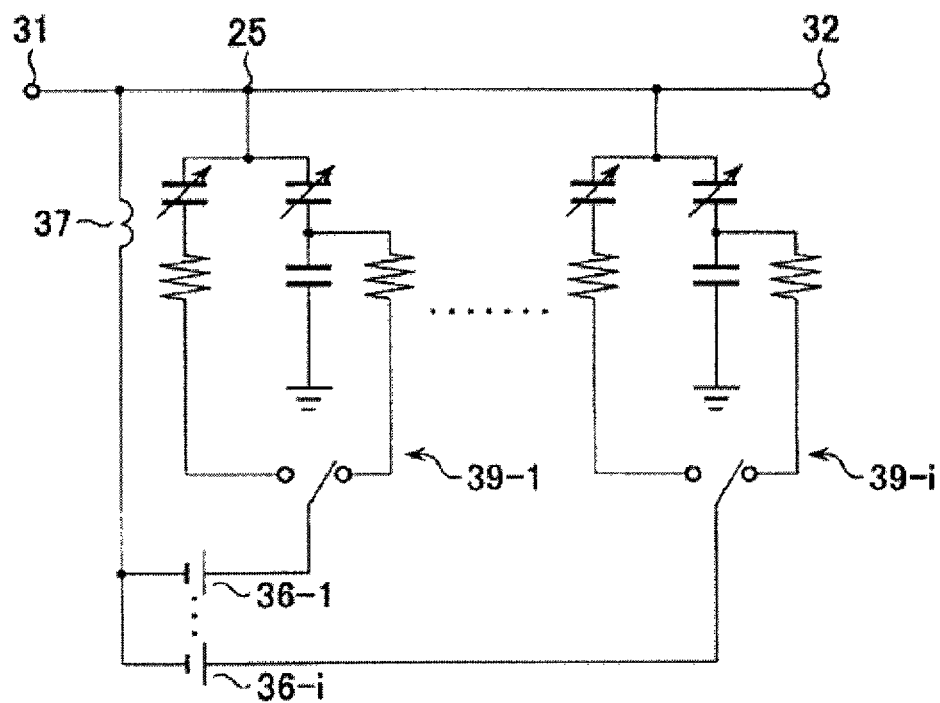

FIG. 5B is an equivalent circuit diagram illustrating another structural example of application circuit. A plurality of variable capacitance circuits 39-1, . . . 39-i are connected to a high frequency signal line 31-25-32, and are connected to a common inductor 37 via external power sources 36-1, . . . , 36-i. The plurality of variable capacitance circuits have differences in the capacitance value, corresponding to plural bits. This structure is fitted for multi-bit circuit, In the second embodiment, the movable electrode is disposed obliquely in the space between the opposing fixed electrodes by the connection position of the anchors and the movable electrode, to enhance position change of the movable electrode. Further, stoppers may be provided for restricting the movable area of the movable electrode.

Figure 6A:
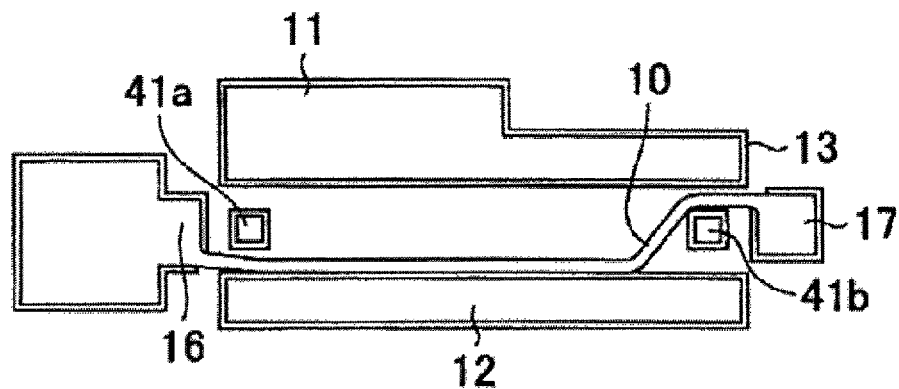
FIGS. 6A-6D are schematic plan views illustrating an electronic device having a variable capacitance element provided with stoppers.

As illustrated in FIG. 6A, stoppers 41a and 41b are disposed adjacent to or in line with the anchors 16 and 17. The stopper 41a serves together with tha anchor 16 to dispose the movable electrode 10 in a space near the fixed electrode 12. The stopper 41b serves together with the anchor 17, to dispose the movable electrode 10 in a space near the fixed electrode 11. In other words, in a right end portion where the movable electrode 10 is near the fixed electrode 11, the stopper 41b is disposed between the movable electrode 10 and the fixed electrode 12, to prevent the movable electrode 10 approaching the fixed electrode 12. In left end portion where the movable electrode 10 is near the fixed electrode 12, the stopper 41a is disposed between the movable electrode 10 and the fixed electrode 11, to prevent the movable electrode 10 approaching the fixed electrode 11.

By securing a certain width to the regions disposed near the fixed electrodes, a drive force will be surely applied to the movable electrode. The stopper 41 can be made by changing the pattern upon etching as illustrated in FIG. 3B. An insulating film will be formed on the surface of the stopper in the steps illustrated in FIGS. 3C and 4A. When the stopper is shaped in a square pole shape, the corner part may apply excessive stress to the movable electrode, and there may be a possibility of deforming the movable electrode.

Figure 6B:
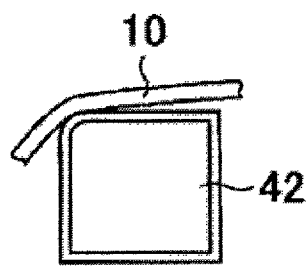
Figure 6C:
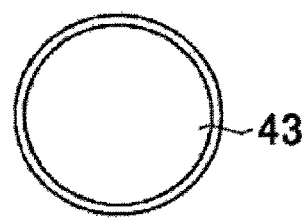
Figure 6D:
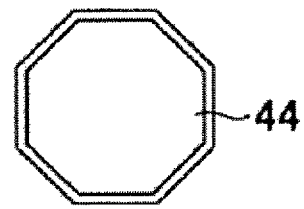
Figure 7A:
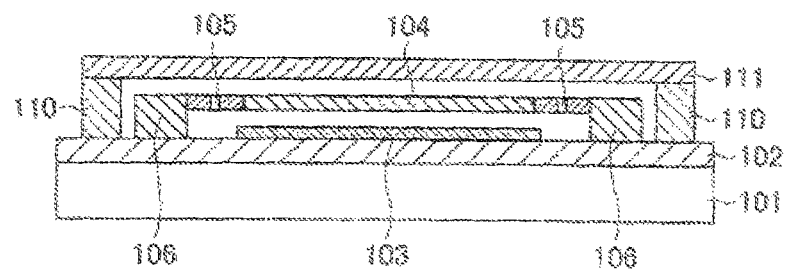
FIGS. 7A and 7B are cross sections illustrating structural examples of the variable capacitance element according to prior art.
Figure 7B:
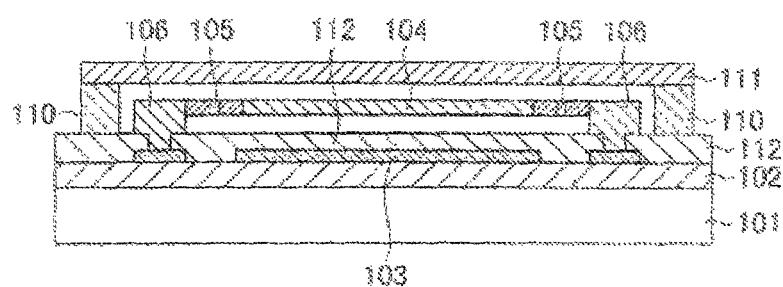

The stopper may be so shaped that a corner or corners are rounded as illustrated in FIG. 6B, that the stopper has round column shape as illustrated in FIG. 6C, or that the stopper has a polygonal column shape as illustrated in FIG. 6D, to migrate the stress which may be applied to the movable electrode.

Although the present invention has been described above along the embodiments, this invention is not limited thereto. Materials and numerical values given as examples are not limitative. For example, in place of an SOI substrate, a laminated substrate which has two sacrificial layers which are different in etching characteristics on a support substrate, can be used, to perform processes as illustrated in FIGS. 3A-3L, to manufacture a structure as illustrated in FIG. 1A or in FIG. 2A. In such case, the bonding silicon oxide film 52 and the active silicon layer 53 illustrated in FIG. 2A will be replaced with sacrificial layers of different etching characteristics. A laminated substrate having a single sacrificial layer on a support substrate can also be used by employing control etching, etc.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What are claimed are:

1. An electronic device having a variable capacitance element, comprising:
    a support substrate providing physical support;
    a pair of anchors formed on said support substrate, and having support portions in direction perpendicular to a surface of said substrate;
    a movable electrode supported by the support portions of said pair of anchors, having opposing first and second side surfaces constituting electrode surfaces, and at least partially capable of elastic deformation;
    a first fixed electrode supported above said support substrate, and having a first electrode surface opposing to the first side surface of said movable electrode;
    a second fixed electrode supported above said support substrate, and having a second electrode surface opposing to the second side surface of said movable electrode;
    a first insulating film disposed on the first electrode surface of said first fixed electrode; and
    a second insulating film disposed on the second electrode surface of said second fixed electrode;
    wherein said movable electrode is made of a metal sheet, and
    wherein in a space between the first electrode surface of said first fixed electrode and the second electrode surface of said second fixed electrode, said movable electrode is disposed nearer to said first electrode surface than to the second electrode surface at one end, and disposed nearer to said second electrode surface than to said first electrode surface at another end.

2. An electronic device having a variable capacitance element according to claim 1, wherein one support portion of said pair of anchors is disposed nearer to said first electrode surface than to said second electrode surface, and another support portion of said pair of anchors is disposed nearer to said second electrode surface than to said first electrode surface, to support said movable electrode.

3. An electronic device having a variable capacitance element according to claim 1, wherein said first electrode surface and said second electrode surface are parallel, and in a space between said first electrode surface and said second electrode surface, said pair of anchors dispose said movable electrode obliquely with respect to said first and second electrode surfaces.

4. An electronic device having a variable capacitance element according to claim 1, wherein said first and second fixed electrodes, said pair of anchors, and said movable electrode are made of same metal material.

5. An electronic device having a variable capacitance element according to claim 4, wherein said metal material includes Au or Cu.

6. An electronic device having a variable capacitance element according to claim 1, further comprising:

first and second stoppers respectively restricting positions of said movable electrode to a side of said first fixed electrode and to a side of said second fixed electrode in a region inner than said pair of anchors.

7. An electronic device having a variable capacitance element according to claim 6, wherein said first and second stoppers include a bonding silicon oxide film formed on said support substrate, and a silicon layer formed on said bonding silicon oxide film.

8. An electronic device having a variable capacitance element according to claim 1, further comprising:

a fixed capacitance connected to one of said first and second fixed electrodes.

9. An electronic device having a variable capacitance element according to claim 1, further comprising:

first and second resistance elements respectively connected with said first and second fixed electrodes.

* * * * *